Patented Jan. 3, 1939

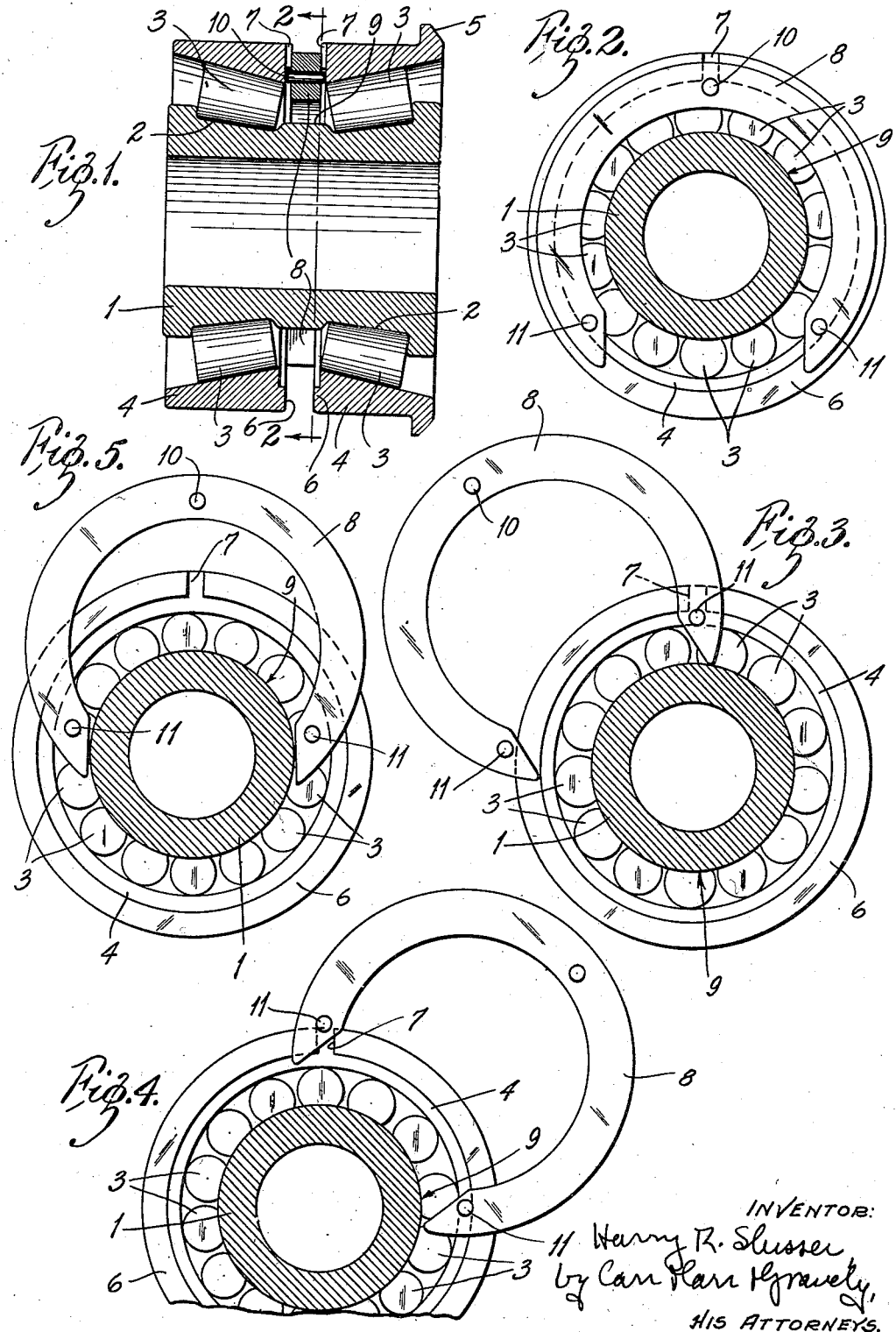

2,142,958

UNITED STATES PATENT OFFICE 2,142,958

DOUBLE ROW ROLLER BEARING

Harry R. Slusser, Canton, Ohio, assignor to The Timken Roller Bearing Company, Canton, Ohio, a corporation of Ohio Application June 20, 1938, Serial No. 214,691

3 Claims. (Cl. 308—214)

My invention relates to roller bearings of the type having two series of rollers and separate outer bearing members therefor, means being provided between said outer bearing members for holding them in proper spaced running position. The invention has for its principal object a bearing of this type in which accidental separation of the parts is prevented, in which the spacer member is so held that it cannot engage the inner bearing member and hence set up friction within the bearing and in which lubrication of the rollers is facilitated.

The invention consists in the double row roller bearing and in the parts and combinations and arrangements of parts hereinafter described and claimed.

In the accompanying drawing,

Fig. 1 is a longitudinal sectional view of a rocker arm bearing embodying my invention, Fig. 2 is a cross sectional view on the line 2—2 in Fig. 1; and Figs. 3, 4 and 5 are cross sectional views showing the sequence of operations in positioning the spacer between the bearing cups.

The rocker arm bearing illustrated in the drawing comprises a double inner bearing member or cone 1 having conical raceways 2 thereon that taper toward the middle of the bearing, two series of conical bearing rollers 3 and a separate outer bearing member or cup 4 for each series of rollers, one of said cups being shown as provided with a peripheral flange 5 for abutment against the face or shoulder of a suitable mounting member, as a rocker arm (not shown in the drawing). The present invention is concerned with the means for holding the bearing cups in proper spaced running position.

The opposed inner end faces of the cups 4 are provided with annular ribs 6 around their outer marginal portions, said ribs stopping short of the inner margins of said end faces. A radial slot 7 extends through each of said annular ribs 6. A substantially C-shaped or arcuate washer 8 of the thickness necessary to space the bearing cups 4 the proper distance apart is mounted between the opposed end faces of said cups 4, the inside diameter of said washer being substantially greater than the diameter of the middle portion 9 of the bearing cone 1. The space between the jaws of said washer is such that, as shown in Fig. 5, the washer may slip easily over the middle portion 9 of the bearing cone 1.

At its middle portion, that is opposite its open end, said washer 8 is provided with a pin 10 that projects from each face thereof; and each jaw is likewise provided near its end with a pin 11 that projects from each face. By turning the cups 4 so that said slots 7 are in alinement, the projecting portions of the pin 11 of one jaw may be moved into the inner periphery of said rib as shown in Fig. 3 and the said pin may be moved along the ribs 6 until the pin 11 of the other jaw is in position to be inserted in said slots 7, as shown in Fig. 4, after which the washer may be moved until the middle pin is in alinement with said slots as shown in Fig. 5, whereupon the washer may be moved into assembled position as shown in Fig. 2. By moving the slots out of alinement, the possibility of accidental displacement of the washer is prevented. Disassembly, when desired, is easily accomplished by reversing the above described assembling process.

The above described construction is easy to assemble and disassemble; proper running clearance is obtained by the selection of the proper sized spacing washer, adjustment being obtained by inserting a washer of a different size, there is no danger of the washer coming in contact with the bearing cone and thus setting up friction within the bearing and the substantial clearance between the washer and the bearing cone facilitates lubrication of the bearing rollers.

What I claim is:

1. A double row roller bearing comprising two annular series of rollers, an outer bearing cup for each series of rollers, the opposed inner ends of said cups being spaced apart and each having an annular outer peripheral rib with a radial slot therethrough, a spacing washer of substantially C-shape interposed between said cups, a pin projecting from each face of said washer near each jaw end and a pin projecting from the middle of each face of said washer.

2. A double row roller bearing comprising a double inner bearing, an annular series of rollers for each of the raceways of said inner bearing member, an outer bearing cup for each series of rollers, the opposed inner ends of said cups being spaced apart and each having an annular outer peripheral rib with a radial slot therethrough, a spacing washer of substantially C-shape with its inside diameter larger than the middle portion of said inner bearing member interposed between said cups, a pin projecting from each face of said washer near each jaw end and a pin projecting from the middle of each face of said washer.

3. A double row roller bearing comprising a double bearing cone with raceways tapering towards the middle thereof, an annular series of rollers for each of said cone raceways, an outer bearing cup for each series of rollers, the opposed inner ends of said cups being spaced apart and each having an annular outer peripheral rib with a radial slot therethrough, a spacing washer of substantially C-shape with its inside diameter substantially larger than the middle portion of said cone interposed between said cups, a pin projecting from each face of said washer near each jaw end and a pin projecting from the middle of each face of said washer.

HARRY R. SLUSSER.